Jan. 19, 1965  A. D. SLOTKIN  3,165,781
HOG DRESSING
Filed March 5, 1963
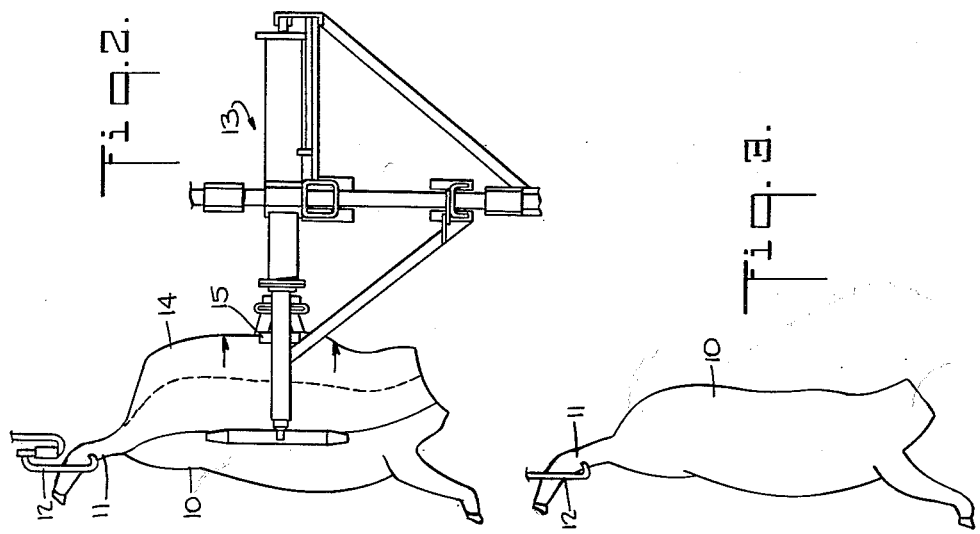
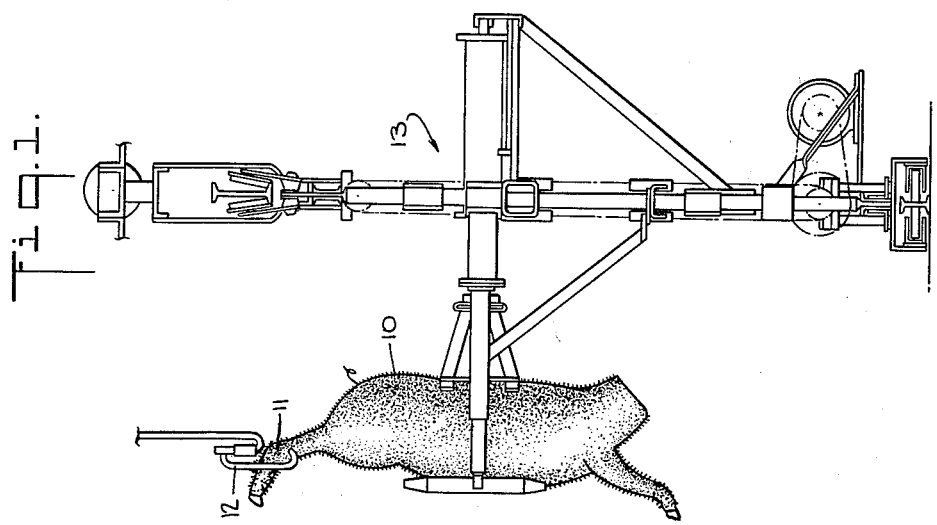
INVENTOR.
A. DONALD SLOTKIN
BY Kenyon & Kenyon
ATTORNEYS

3,165,781
HOG DRESSING

Alan Donald Slotkin, Indianapolis, Ind., assignor to Hygrade Food Products Corporation, Detroit, Mich., a corporation of New York
Filed Mar. 5, 1963, Ser. No. 262,953
2 Claims. (Cl. 17—45)

This invention relates to a method of dressing a hog carcass. More particularly, the invention relates to a method of dressing a hog carcass in which substantially the entire hide is removed from the carcass in one piece.

Heretofore, the cutting of hogs involved a substantial amount of skilled labor in order to remove all or portions of the skin from the primal joints. The conventional procedure also involved several expensive and time-consuming operations on the whole carcass on the killing floor prior to chilling and cutting.

It is an object of the present invention to provide a method of cutting a hog carcass which eliminates the substantial amount of skilled labor heretofore necessary to remove all or portions of the skin from the cut sections.

It is a further object of the present invention to provide a method of dressing a hog carcass which avoids expensive prehandling of the hog carcass prior to cutting into primal cuts.

Briefly stated, the present invention is directed to a new method of dressing a hog carcass. The steps comprise (1) removing substantially the entire hide from the carcass in one piece, (2) chilling the skinned carcass, and (3) disassembling the skinned carcass into its major and minor cuts.

The invention will be more readily understood when described in connection with the drawings in which:

FIG. 1 is a schematic drawing depicting the carcass suspended prior to skinning;

FIG. 2 is a schematic drawing depicting the carcass during the skinning operations; and FIG. 3 is a schematic drawing of the carcass subsequent to the removal of the hide.

Prior to this invention, almost all the skin or hide remained on the hog during the killing operation and only the hair was removed on the killing floor. In order to prepare for the dehairing operation, the carcass is treated with hot water (approximately 140° F.) in a very large scalding tank. This scalding tank loosens up the hair and skin of the hog to prepare the hog for the dehairer. The operation is costly in terms of the initial expense of the tank, and the conveyors and dunkers which pull the hog through this tank. Continuous sensitive temperature recorders are necessary to control temperatures to close tolerances. Also there are operating expenses in connection with the scalding tank due to the necessary daily cleaning of the tank and the heating of vast volumes of water.

From this tank the hogs are conveyed into a dehairer machine which beats most of the "softened" hair from the carcass.

The next step in the dressing, according to prior methods, was the singeing of the carcasses.

Although the dehairing step, described above, removes most of the hair, the singeing step is required to remove any remaining hair. The singeing equipment is expensive and requires substantial floor space. The cost of operating the unit is expensive in view of the fuel required.

Following the singeing and final dressing operations the hog carcasses are chilled for a period of 12 to 20 hours in order to lower the internal ham temperature to approximately 36–38° F. This temperature is necessary in order to firm up the hog and permit it to be cut into primal cuts with minimum bacteria growth and spoilage.

After the hog is cut into primal cuts, extensive skinning operations are conducted on certain items. Thus, for example, the skin is completely removed from the sections such as the Boston Butt, the Loin, Belly, Fat Back, and Jowl. The skin must be partially removed or trimmed from cuts such as the Ham and the Picnic. These skinning operations are generally performed by skilled labor and the cost is relatively high.

In accordance with the present invention, the hogs after slaughtering are handled as shown in FIG. 1. The head is removed and the carcass is processed on equipment similar to that described in U.S. Patent No. 2,696,633.

As shown in FIG. 1, the carcass 10 is hung by hind legs 11 on a hook 12. The balance of the apparatus 13 is patterned after that disclosed in U.S. Patent No. 2,696,633 for the purposes of exposition. However, it is to be understood that any type of apparatus which is suitable for stripping the hide from an animal may be used.

In FIG. 2, the carcass 10 is shown with the hide 14 substantially removed. This is accomplished by jaws 15 which are motivated by hydraulic cylinders, not shown.

FIG. 3 depicts the carcass after removal of the hide.

In accordance with the present invention, the carcass 10 with the hide removed is then transported to the refrigerating area where it is chilled in order to facilitate cutting into sections. Removal of the hide prior to the chilling process speeds up the chilling cycle since the hide 14, which serves as an insulating medium, is removed.

Not only is the present process advantageous from the point of view of eliminating costly labor heretofore required for trimming and skinning the various bulk sections, but a pork hide in one large section is, for the first time, made available for sale. When dressing hogs according to prior processes, the skin was obtained in a plurality of small irregularly shaped pieces. These pieces were sold for a very low price because of the restrictions placed on their use due to size. By making available a large section of hide in one piece, the present process provides a by-product which is very valuable and may be sold to the tanning industry for manufacturing leather articles.

An additional advantage of the present invention is that the hog carcass may be trimmed by new and different methods. Thus, for example, surplus fats may be removed before the carcass is cut into sections, thereby consolidating several manual operations into a single step. Further, the skinning of the hog carcass may result in entirely new butchering methods. Such new butchering methods would lend themselves to automation since most of the manual operations heretofore were involved in trimming and removing the skin.

Although one particular method has been described for the removal of the entire hide from the carcass, it is to be understood that other methods may be suitably employed for this purpose.

What is claimed is:
1. A method of dressing a hog carcass comprising the steps of slaughtering the hog, securing the hide of the slaughtered hog to gripping means, mechanically moving said gripping means in relation to the carcass to strip substantially the entire hide therefrom in one piece, chilling the skinned carcass, and butchering the carcass into primal cuts.

2. In the process of dressing a hog carcass wherein the hog is slaughtered, the carcass is processed, chilled and butchered into primal cuts, the improvement comprising the steps of slaughtering the hog, securing the hide of the slaughtered carcass to gripping means, and mechanically moving said gripping means in relation to the carcass to strip substantially the entire hide therefrom in one piece.

References Cited by the Examiner
UNITED STATES PATENTS

| | | | |
|---|---|---|---|
| 243,809 | 7/81 | Sparrow | 17—45 X |
| 1,837,514 | 12/31 | Agar | 17—45 |
| 2,654,122 | 10/53 | Derby | 17—45 |
| 2,696,633 | 12/54 | Hincks | 17—21 |

SAMUEL KOREN, *Primary Examiner.*

LUCIE H. LAUDENSLAGER, *Examiner.*